US006206284B1

(12) United States Patent
Do et al.

(10) Patent No.: US 6,206,284 B1
(45) Date of Patent: Mar. 27, 2001

(54) FLEXIBLE CONFIGURATION AUTOMATIC TELLER MACHINE

(75) Inventors: Cuong Do, Woodland Hills; Avery Bairamian, Glendale; Xuan S. Bui, Culver City; Joe Butryn, Los Angeles; Edward M. R. Dudasik, West Hills; Marc Andino Guzman, Studio City; Nhut Trung Ha, Los Angeles; Mohammed Khan, Simi Valley; Mitsuru Tamura, Gardena; Randal H. Yokomoto, Torrance, all of CA (US)

(73) Assignee: Citicorp Development Center, Inc.

( * ) Notice: Subject to any disclaimer, the term of this patent is extended or adjusted under 35 U.S.C. 154(b) by 0 days.

(21) Appl. No.: 09/441,210

(22) Filed: Nov. 16, 1999

Related U.S. Application Data

(63) Continuation of application No. 08/698,877, filed on Aug. 16, 1996, now Pat. No. 5,984,177.

(51) Int. Cl.[7] .......... G06F 17/60
(52) U.S. Cl. .......... 235/379; 902/8
(58) Field of Search .......... 235/379, 375; 902/8, 30, 32, 20, 31, 33, 34, 35

(56) References Cited

U.S. PATENT DOCUMENTS

| | | | |
|---|---|---|---|
| 4,134,537 | 1/1979 | Glaser et al. | 235/379 |
| 4,166,945 | 9/1979 | Inoyama et al. | 235/379 |
| 4,355,369 | 10/1982 | Garvin | 235/379 |
| 4,735,289 | 4/1988 | Kenyon | 902/20 |
| 4,754,126 | 6/1988 | Caldwell | 235/379 |
| 5,071,031 | 12/1991 | Yuge et al. | 235/379 |
| 5,202,549 | 4/1993 | Decker et al. | 235/379 |
| 5,253,167 | 10/1993 | Yoshida et al. | 235/379 |
| 5,286,954 | 2/1994 | Sato et al. | 235/379 |
| 5,483,047 | 1/1996 | Ramachandran et al. | 235/379 |
| 5,616,900 | 4/1997 | Seewoster | 902/20 |

FOREIGN PATENT DOCUMENTS

| | | | |
|---|---|---|---|
| 134968 | 7/1985 | (JP) | 235/379 |
| 404058389 | 2/1992 | (JP) | 902/8 |
| 404096894 | 3/1992 | (JP) | 902/8 |

*Primary Examiner*—Thien M. Le
*Assistant Examiner*—Larry Taylor
(74) *Attorney, Agent, or Firm*—George T. Marcou; Kilpatrick Stockton LLP

(57) ABSTRACT

An automated bank teller machine (ATM) is provided which is characteristically easy to configure, regardless of whether a replenish-from-the-front (RFTF) configuration or a replenish-from-the-rear (RFTR) configuration is chosen. In particular, the ATM according to the present invention includes a security chest module, a top module, and an interface module. These components are common to both configurations can be built and stored in advance, and can be thereafter configured as desired. In another embodiment, an ATM is provided that permits more than one customer to use the ATM at the same time.

5 Claims, 6 Drawing Sheets

1

FLEXIBLE CONFIGURATION AUTOMATIC TELLER MACHINE

This Application is a Continuation of Ser. No. 08/698,877 filed Aug. 16, 1996 now Pat. No. 5,984,177.

BACKGROUND OF THE INVENTION

1. Field of the Invention

The present invention relates to automatic bank teller machines (ATMs).

2. Description of Related Art

Automatic bank teller machines (ATMs) are becoming increasingly popular because they make banking functions available to customers virtually around the clock, and at a variety of locations, in addition to bank branches.

One function of an ATM is to serve as a cash dispenser and/or as a cash depository. This enables a bank customer to draw cash from a bank account, and also to deposit money into the account. In general, an ATM dispenses cash from and takes in cash and checks into a secure chest, through apertures provided in the chest and/or a door through which the chest is accessed.

Historically, ATM suppliers have provided two basic configurations of the ATM. The first is called "replenish-from-the-front", or RFTF. In this configuration, the ATM is serviced (i.e., cash replenished, deposits removed, and blank transaction records refilled) by a service person standing at the front of the ATM. The "front" of the ATM is also where a customer stands while using the ATM. A door is provided on the front of the ATM to permit access to the secure chest.

The second common ATM configuration is "replenish-from-the-rear", or RFTR. In this configuration, the ATM is serviced from the rear, on the side opposite to where a customer stands to use the ATM. In this case, a door is provided on the rear of the ATM to provide access to the secure chest.

However, with two ATM configurations available, ATM suppliers have had to exert great planning effort to determine which configuration is to be provided at a site, and how many of each configuration is to be provided. The need to know this information well in advance of assembly, and for the need for commensurate manufacturing build/buy schedules has undesirably added to the cost of deploying significant numbers of ATMs.

SUMMARY OF THE INVENTION

It is therefore an objective of the present invention to provide an ATM that is characteristically easy to configure in either an RFTF or an RFTR configuration. It is another objective of the present invention to provide an ATM that can be used by more than one customer, simultaneously.

In a first embodiment of the present invention, the ATM consists of several standardized equipment modules. Because the modules can be configured in either an RFTF or RFTR configuration, they can be pre-assembled and warehoused, without inconvenient preplanning of configurations, as with the above-described conventional ATM. Commonality of the components, particularly the secure chest, reduces the cost of manufacturing in both the RFTF and RFTR configurations.

In particular, the present invention permits the access door of the secure chest to be easily configured so as to hinge on either the right or the left side, in accordance with the replenish configuration chosen.

In a second embodiment of the present invention, an ATM that can be used by multiple users is provided. In this embodiment, two customers can access the machine from, for example, opposite sides thereof. The features of the present invention that permit switching between RFTF and RFTR ATM configurations in the first embodiment are used, in the second embodiment, to permit such multi-user simultaneous access.

These and other objects and novel features of the present invention will become more apparent from the following detailed description, taken in conjunction with the accompanying drawings.

DESCRIPTION OF THE PREFERRED EMBODIMENT

The ATM according to the present invention consists of a number of standard equipment modules. In general, the equipment modules can be used to configure both RFTR and RFTF ATMs according to the first embodiment, and multi-user ATMs according to the second embodiment.

Figure 1:
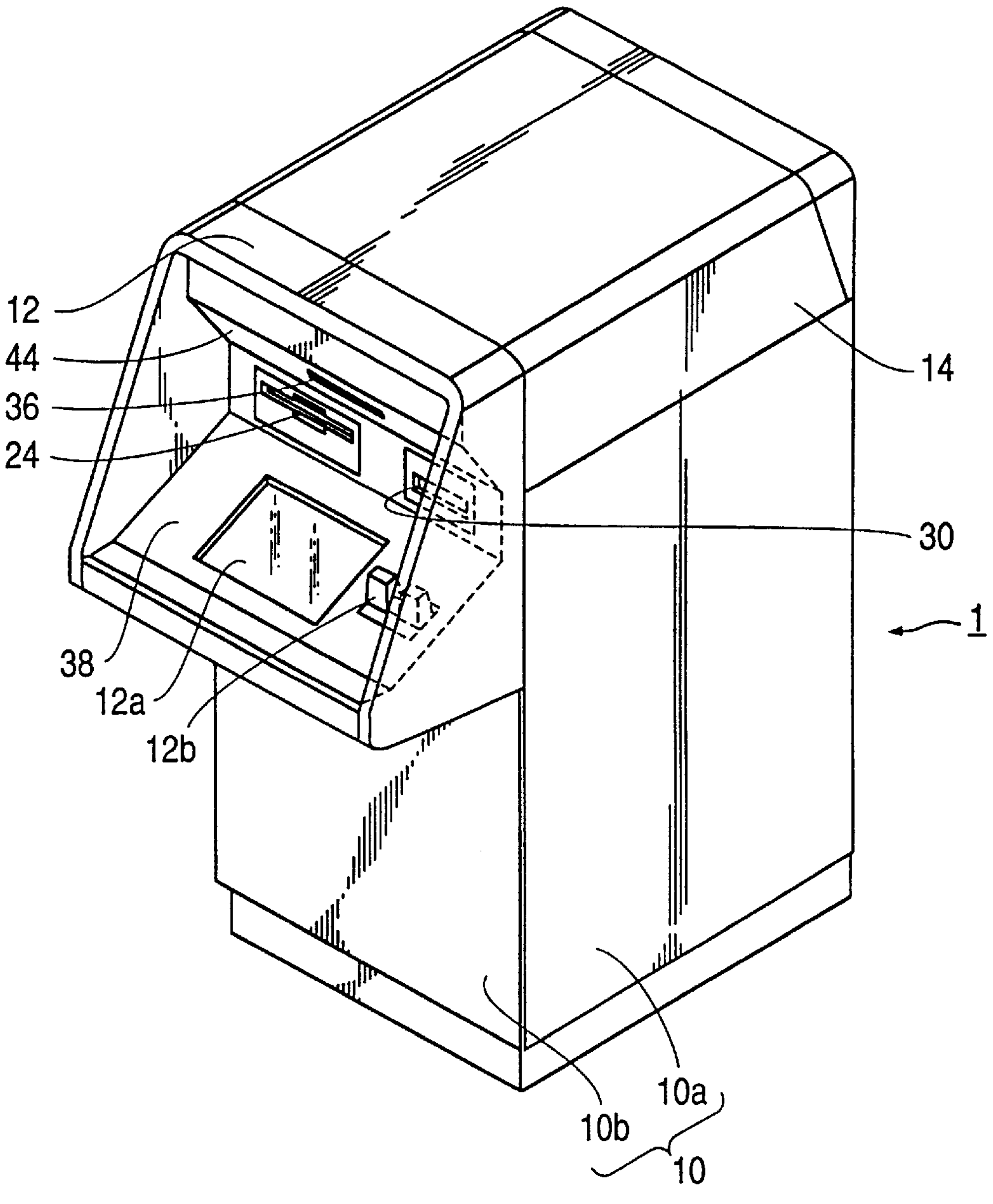
FIG. 1 is a perspective view of an ATM according to a first embodiment of the present invention.

FIG. 1 is a perspective view of an RFTF ATM 1 according to the first embodiment of the present invention. The RFTF ATM, as illustrated, includes a security chest module 10, a customer interface module 12, and a top module 14. In FIG. 1, the security chest module 10 includes a box portion 10*a* and a door member 10*b* which is swing-mounted on box portion 10*a* by, for example, a hinge assembly.

Figure 2:
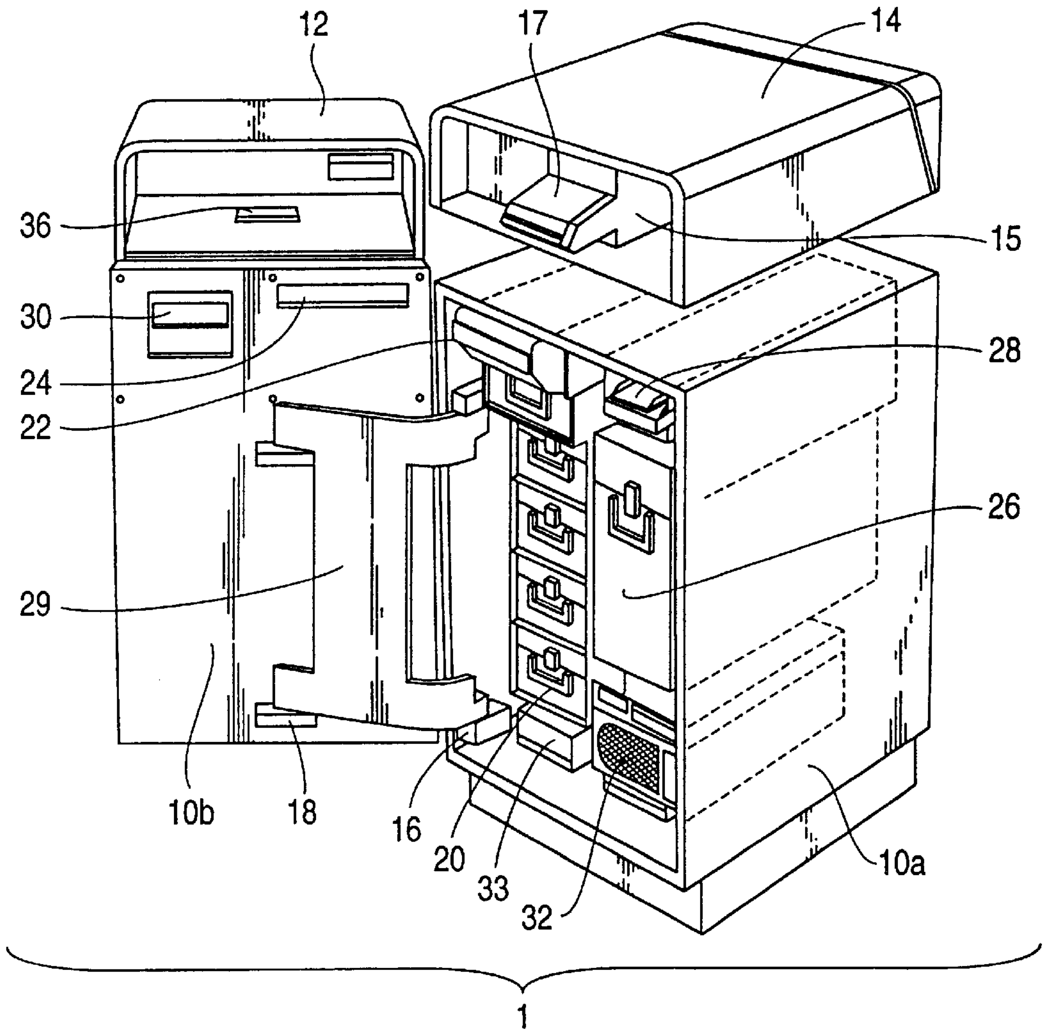
FIG. 2 is a partially exploded view of an RFTF ATM according to the first embodiment of the present invention.

FIG. 2 is a partially exploded view of the RFTF ATM shown in FIG. 1, in which door member 10*b* is shown in an open state, thereby exposing the interior of security chest module 10. It is noted that FIG. 2 illustrates door member 10*b* as being hinged on its left edge. However, it is an aspect of the present invention to provide a door member 10*b* which can be hinged on either the left or right side of box portion 10*a*.

Box portion 10*a* is, for example, a five-walled, open-box. It is made from any material suitable for secure safe box-type applications, such as steel. Other considerations such as fire-resistance may affect selection of the material for making box portion 10*a*. Box portion 10*a* may also be provided with thermal insulation in a conventional manner to enhance fire-resistance.

Door member 10*b* is swing-mounted on box portion 10*a,* via a hinge plate 29, at hinge points 16, located on an interior wall of box portion 10*a,* and 18, located on door member 10*b*.

To permit door member 10*b* to be mounted on the other side of box portion 10*a* (i.e., the right side, as seen in FIG. 2), hinge points corresponding to hinge points 16 may be provided on the opposing interior wall of box portion 10*a* (not shown here). In this case, hinge plate 29 is reversed, to use the other hinge points on the interior of box portion 10*a* and also hinge points 18. Door member 10*b* would therefore be hinged along its right edge instead of the left-side orientation shown in FIG. 2. It is a preferred feature of the present invention to provide hinge points on both sides of box portion 10*a,* so as to permit the mounting orientation of door member 10*b* to be changed.

Door member 10*b* may be locked closed by a conventional locking mechanism (not shown), such as a key-operated sliding bolt, a code-actuated lock, a combination lock, etc.

One side of box portion 10*a* is provided with a conventional, front-loaded cash dispensing machine 20. Cash dispensing machine 20, in this case, is characteristically loaded (i.e., replenished) from the same side from which cash is dispensed. It has a cash dispensing output 22 which is aligned with a slot opening 24 provided in the door member 10*b*. A customer receives the dispensed cash through slot opening 24.

The other side of box portion 10*a* is provided with a conventional deposit envelope intake bin 26. Intake bin 26 may be, for example, a simple bin having a selectively opened slot through which a deposit envelope is inserted. Another example of an intake bin 26 according to the present invention is provided with motorized rollers for positively pulling a deposit envelope from the customer's hand into the bin. In general, intake bin 26 has an intake portion 28 which is aligned with a slot opening 30 provided in door member 10*a.* In the example of the present invention illustrated in FIG. 2, intake bin 26 is accessed through the same side as intake portion 28. This is in keeping with the RFTF configuration of the ATM shown in FIG. 2.

It is a characteristic of the present invention to provide an ATM which has a consistent overall configuration, regardless of whether an RFTR configuration or an RFTF configuration is chosen. In this regard, the cash dispensing machine 20 and the deposit envelope intake bin 26 are consistently provided at the same respective sides of the ATM. That is, for example, the cash dispensing machine 20 is always provided at the left side of the ATM and the deposit envelope intake bin is always provided at the right side. Therefore, customers do not experience any confusion in using the ATM, even though they may use different configurations thereof.

Box portion 10*a* may additionally be provided with a conventional power supply and/or alarm battery unit 33, for providing power to the ATM components. In addition, a conventional computer unit 32 may be provided in box portion 10*a* for controlling the automated operation of the ATM. The computer unit may further include conventional telecommunication equipment (not shown here) for providing a data link to a bank's central computer system.

Box portion 10*a* is provided with two additional slots (not shown) on the side which is opposite to door member 10*b*. In general, these slots mirror slots 24 and 30 in door member 10*b*. In the RFTF ATM, one of these slots is fitted with an exhaust fan to help cool the interior of box portion 10*a.* The other slot is sealed off by a security plate which is, for example, bolted into place. These slots are used for cash dispensing and deposit envelope intake when box portion 10*a* is used in an RFTR ATM, as discussed further below.

A customer interface module 12 is provided on the front of the ATM. The customer interface module 12 generally includes conventional components, such as a display screen for displaying visual information to the customer, and an input keypad which the customer uses to input information, such as a password, or a requested cash withdrawal amount. The display screen and keypad may be alternatively incorporated into a single touchscreen unit 12*a,* as is conventionally known. Customer interface module 12 may also include a dip-type magnetic stripe card reader 12*b.* Structurally, customer interface module 12 is preferably provided with non-transparent side panels to provide privacy to the customer, especially during entry of a password using the keypad.

Finally, top module 14 is mounted on top of security chest module 10 and includes a conventional bank transaction record printer 15, and may additionally include a transport-type magnetic stripe card reader (not shown here). The record printer 15 is preferably provided along the front-back centerline of security chest module 10 and outputs a transaction record from an output portion 17 through a slot 36 provided in an upper portion of customer interface module 12 (see FIG. 1, for example). The transport-type card reader, if provided, is located to one side of the record printer. Top module 14 is characteristically constructed so that it is reversible relative to security chest module 10. That is, top module 14 can be mounted in one orientation for the RFTF ATM, and can be rotated through 180 degrees to be used for the RFTR ATM. Because of this, a customer sees the same orientation of the card reader relative to the printer, regardless of whether the ATM is RFTF or RFTR. As discussed above with regard to security chest module 10, this means that a customer can use an ATM having a consistent arrangement, without regard to being RFTF or RFTR.

Figure 3:
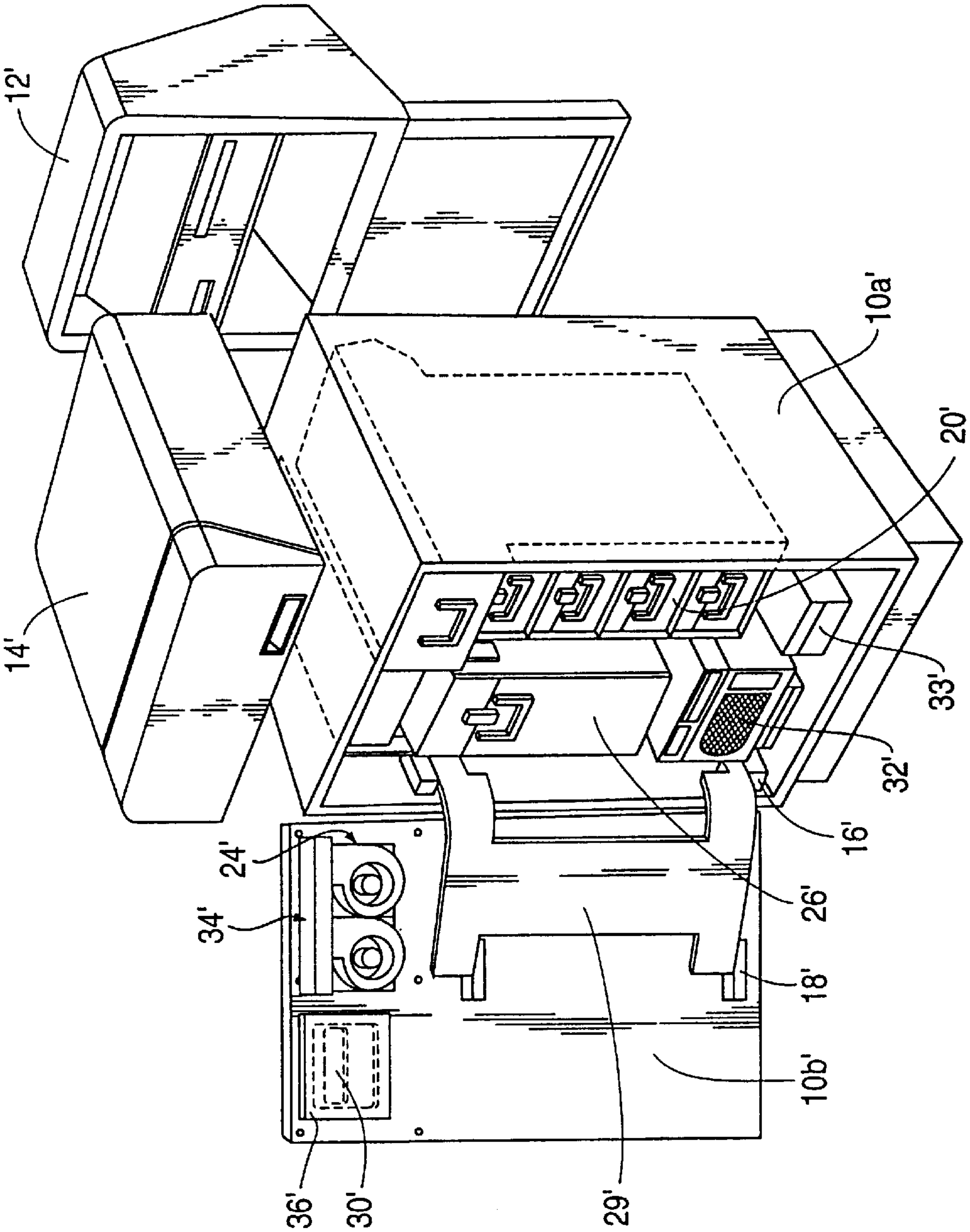
FIG. 3 is a partially exploded view of an RFTR ATM according to the first embodiment of the present invention.

FIG. 3 is a partially exploded perspective view of an RFTR configuration ATM 2 according to the present invention. In describing the RFTR ATM, components corresponding to those in the RFTF ATM will be identified by the same reference numerals with a prime, such as 14'. It is noted that the components described in reference to the RFTR ATM are the same as used for the RFTF ATM described above, with only slight modifications being required thereof. Such is in keeping with the objective of the present invention to provide a flexible configuration ATM. Thus, any particular description of the components in the RFTF ATM may apply equally to the corresponding component in the RFTR ATM.

The similarity between the ATM configurations shown in FIGS. 2 and 3 will be readily appreciated, the differences generally being the reversal of the cash dispensing machine 20' and the deposit envelope intake bin 26' within box portion 10*a*', and the 180° reversal of the top module 14'.

Thus, in the RFTR ATM, cash dispensing machine 20' is a rear-loaded device, with cash being dispensed to the customer through a slot (not shown) provided in the side of box portion 10*a*' opposite to door member 10*b*', while being replenished from the side thereof adjacent to door member 10*b*'.

Likewise, deposit envelope intake bin 26' takes in deposit envelopes through the other aforementioned slot which is opposite door member 10*b*' and is accessed at the side adjacent to door member 10*b*'.

It can be seen in FIG. 3 that cash dispensing machine 20' and deposit envelope intake bin 26' are switched in position within box portion 10*a*'. It can be appreciated that this again places the cash dispensing slot on the left side of the ATM and the deposit envelope intake on the right side, relative to a customer. Therefore, a customer sees the ATM arranged in the same manner as the RFTF ATM illustrated in and discussed with respect to FIG. 2. This is in keeping with the objective of providing a consistent ATM arrangement, from the customer's perspective.

Moreover, in the RFTR ATM, slot 24' in door member 10*b*' has an exhaust fan unit 34' mounted thereto to provide airflow to cool the interior of box portion 10*a*'. As discussed above, slot 24' corresponds to slot 24 in the RFTF ATM, through which cash is dispensed to the customer. Slot 30' formed in door member 10*b*' is closed off by a security plate 36', by bolting for example. Slot 30' corresponds to slot 30 in the RFTF ATM, through which deposit envelopes are deposited into the ATM.

Figure 4C:
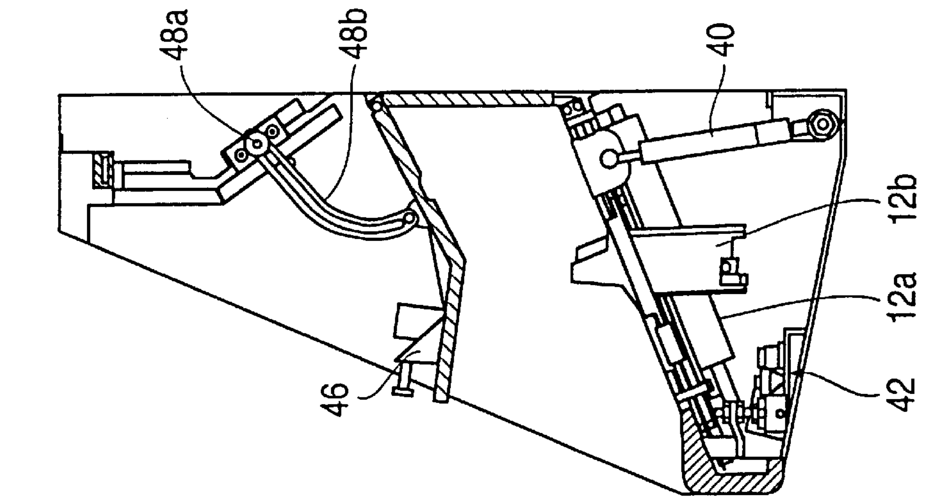
FIGS. 4*a*–4*c* are side sectional views of the customer interface module of the present invention, illustrating how internal components are accessed during service.
Figure 4B:
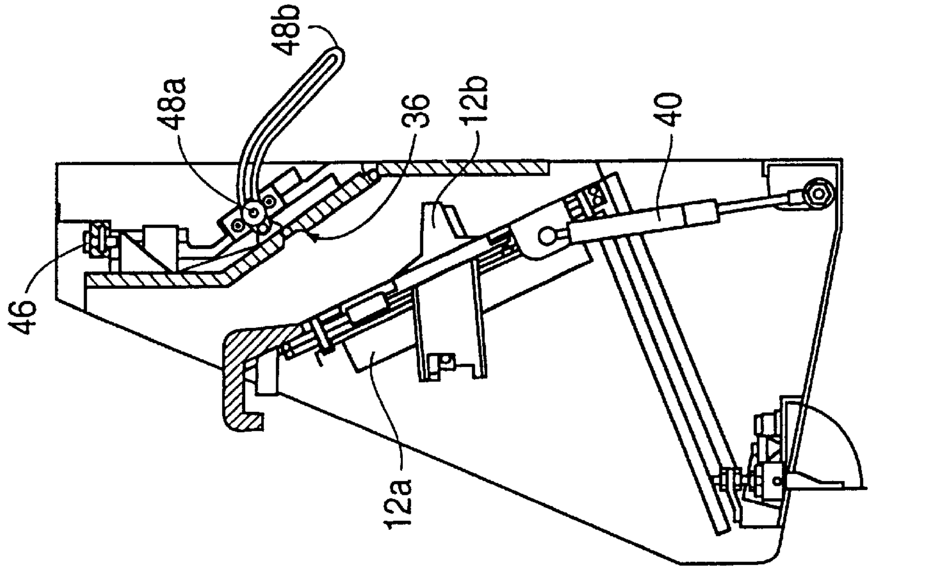
Figure 4A:
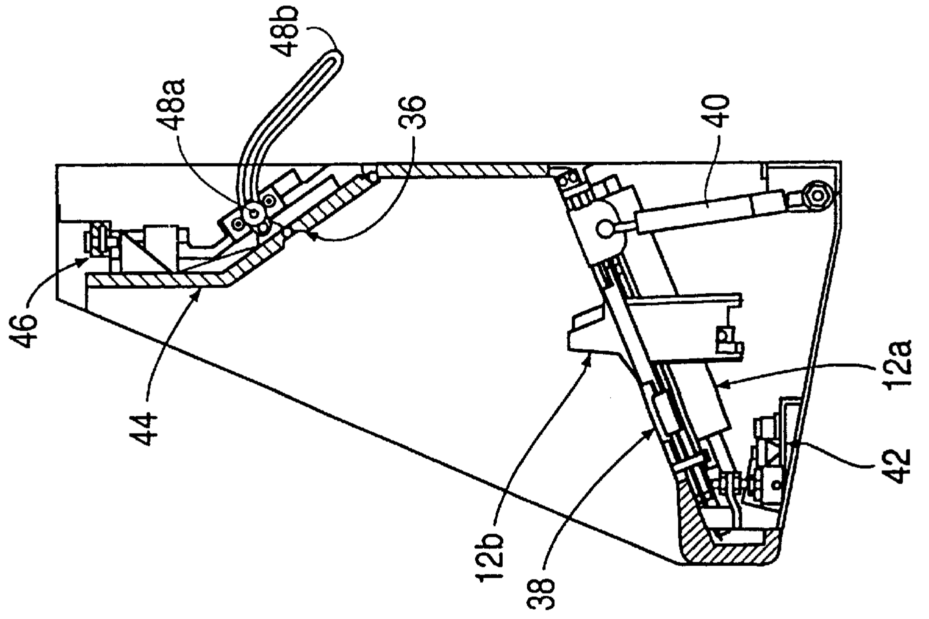

FIG. 4*a* is a side sectional view of the customer interface module 12, 12' according to the present invention, illustrating the arrangement thereof while the ATM is in service and available for use to a customer.

FIG. 4*b* is a side sectional view of the customer interface module 12, 12' in which interface panel 38, on which the display screen and card reader (12*a* and 12*b*, respectively, in FIG. 1, for example) are provided, is swung open upwardly, on hinges, for example, to allow these components to be serviced. Interface panel 38 may be held open by a pneumatic gas cylinder-piston assembly 40, and may be locked in its closed position by, for example, a key-lock latch assembly 42.

Similarly, FIG. 4*c* is a side sectional view illustrating how the printer panel 44, in which transaction record output slot 36 is provided, is swung open downwardly to permit service access. Printer panel 44 may be held closed by a latch, such as solenoid-activated latch 46. Printer panel 44 may be guided in its opening motion by a pin 48*a* guided along curved slot rail 48*b*.

In general, according to the present invention, the various aforementioned modules are mounted relative to one another by any conventional method, such as bolting, welding, or riveting. If a "reversible" mounting method is used, such as nut/bolt fasteners, an arrangement may be had where any given ATM may be switched between RFTF and RFTR configurations. This must take into account all necessary security considerations to safeguard the integrity of the module interconnections, however.

In the second embodiment of the present invention, a multi-user ATM is provided that permits more than one person to use it simultaneously. In general, the multi-user ATM permits, for example, two customers to use the ATM while standing at opposite sides thereof. The structure of the multi-user ATM, as will be seen, is generally related to that of the RFTF and RFTR ATMs, and much of the description made above will also apply here.

Figure 5:
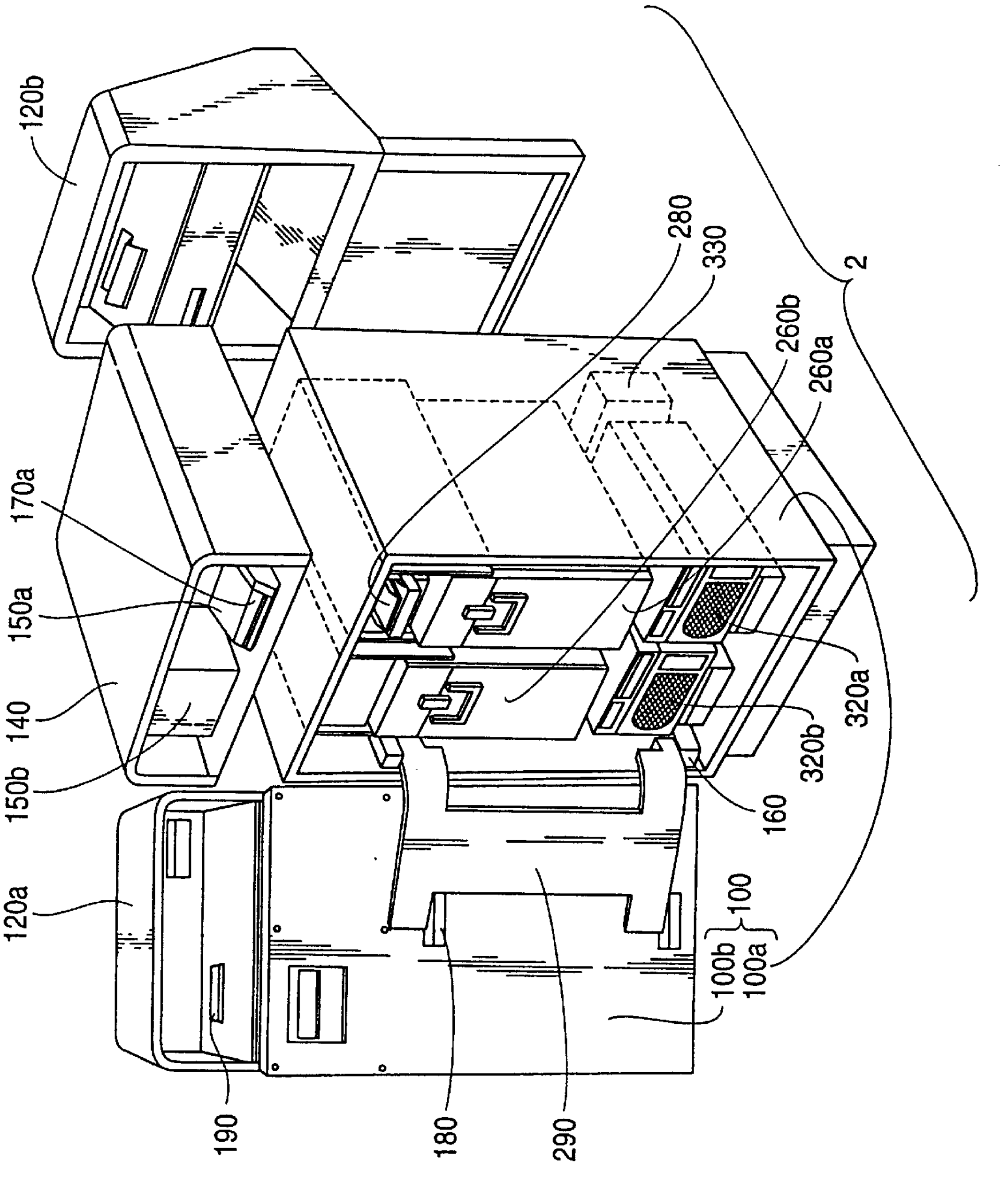
FIG. 5 is a partially exploded perspective view of an ATM according to a second embodiment of the present invention.

FIG. 5 illustrates an example of a multi-user ATM according to the second embodiment. The ATM 3 in FIG. 5, in this instance, is an automated cash depository. The ATM 3 is designed only to take in deposits from customers, and not, for example, dispense cash.

The ATM 3 generally includes a security chest module 100, first and second customer interface modules 120*a* and 120*b*, and a top module 140.

The security chest module consists of a box portion 100*a* and a door member 100*b*. Box portion 100*a* again may be a five-walled box with an open side, as in the first embodiment. As with the first embodiment, box portion 100*a* may be made from steel or the like, and may be adapted as necessary to provide fire resistance and other security features.

Door member 100*b* is swing-mounted on box portion 100*a* by a hinge mechanism like that used in the RFTF and RFTR ATMs described above. The hinge mechanism includes a hinge plate 290 that is attached to box portion 100*a* and door member 100*b* at hinges points 160 and 180, respectively. Door member 100*b* can be mounted so as to swing from either the right or left side of box portion 100*a* in the manner described previously.

Door member 100*b* can be locked close by any suitable locking mechanism, including the examples given above relative to the first embodiment.

It is a particular aspect of the second embodiment to provide at least two customer interface modules, such as first and second customer interface modules 120*a* and 120*b* seen in FIG. 5. Preferably, first and second customer interface modules 120*a* and 120*b* are provided on opposite sides of security chest module 100.

Thus, according to the second embodiment, the interior of box portion 100*a* is provided with two conventional deposit intake bins 260*a*, 260*b*, instead of a deposit intake bin and a cash dispensing machine as in the first embodiment. The deposit intake bins may be the same as the type used in the first embodiment.

Each deposit intake bin has an intake portion through which deposits are received. In FIG. 5, only intake portion 280 of deposit bin 260*a* is shown. The intake portion for deposit bin 260*b* faces in the opposite direction, and is not illustrated.

It can be seen, moreover, that deposit intake bin 260*a* is serviced from the front, on the same side as where deposits are taken in through intake portion 280. On the other hand, deposit intake bin 260*b* is serviced from the rear, on the side opposite its intake portion.

Intake portion 280 is aligned with a slot opening 300 in door member 100*b*. Deposits are passed through slot opening 300 to the intake portion 280, and thereafter into deposit intake bin 260*a* itself.

As in the first embodiment, another slot opening (not shown) is provided in the rear wall of box portion 100*a*. The intake portion of deposit intake bin 260*b* is aligned with that slot opening in the rear wall of box portion 100*a*, thereby permitting a second customer to make deposits.

It will be appreciated from FIG. 5 that customers on both sides of ATM 3 will see a deposit slot opening, in this example, on the right side of the ATM. Thus, in keeping with the overall philosophy of the present invention, customers can become familiar with the configuration of the ATM, and can "expect" the deposit slot opening to be on the right side of any ATM of this type that they may use. Of course, by switching the positions of deposit bins 260*a* and 260*b* within box portion 100*a*, an arrangement can be had where the customer would see the deposit slot opening on the left side of the ATM.

As in the first embodiment, box portion 100*a* may be additionally provided with a conventional computer unit for controlling automated operation of the ATM. In this case, two computer units 320*a*, 320*b* are provided, by way of example. In addition, a power supply and/or alarm battery unit 330 may be provided within box portion 100*a*. The computer unit or units may include conventional telecommunication equipment (not shown) for providing a data link to a bank's central computer system.

The first and second customer interface modules 120*a*, 120*b* are substantially similar to customer interface module 12 described above with respect to the first embodiment and are provided with a card reader unit (or other identity verification/use authorization mechanism) and a data input/ output interface (such as a keypad and display screen combination). Both customer service modules 120*a,* 120*b* can be serviced in accordance with FIGS. 4*a*–4*c* and the description related thereto.

In this example, top module 140 is provided with two bank transaction record printers, each associated with one of the two sides of the ATM. For example, as illustrated in FIG. 5, top module 140 contains printers 150*a* and 150*b*. Printer 150*a* has an output portion 170*a* that corresponds to a slot opening 190 located in an upper portion of customer interface module 120*a*. Printer 150*b* has a corresponding output portion (not seen here due to the arrangement of parts) that corresponds a slot opening in customer interface module 120*b*.

Figure 6:
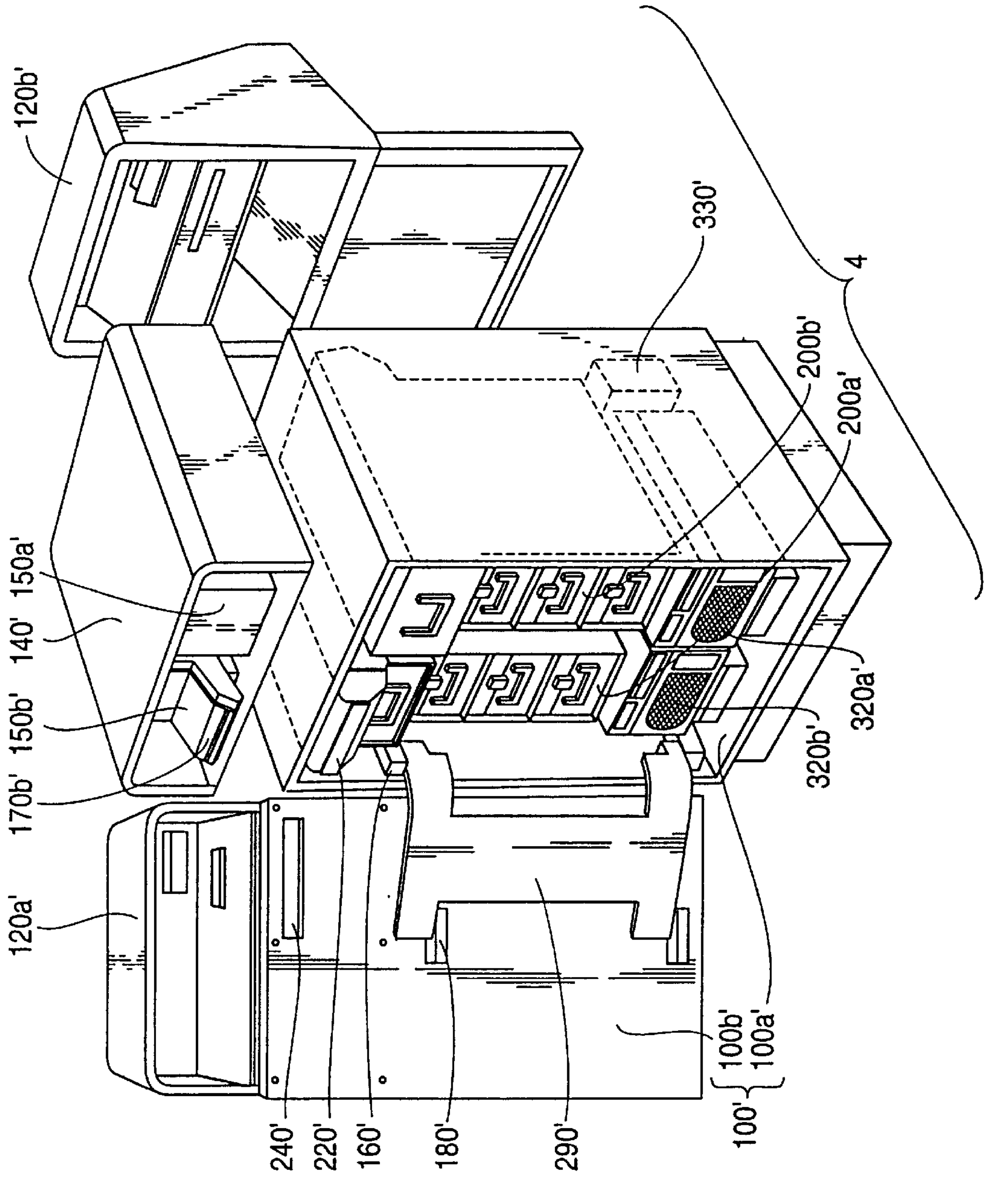
FIG. 6 is a partially exploded perspective view of yet another ATM according to the second embodiment of the present invention.

FIG. 6 illustrates another ATM in accordance with the second embodiment of the present invention. The ATM 4 is a multi-user automated cash dispenser. It will be appreciated that ATM 4 is similar in structure to the ATM 3 illustrated in FIG. 5. Accordingly, substantially identical components in ATM 4 are identified in FIG. 6 by the corresponding reference numeral used in FIG. 5, with a prime appended thereto (e.g., box portion 100*a*'). Where the description would be repetitive, certain elements in FIG. 6 are not described, and reference is made to the foregoing description of the corresponding part. It is emphasized here that the components used in all four types of ATMs disclosed herein are identical and are merely arranged in different configurations.

In ATM 4, two cash dispensing machines 200*a*' and 200*b*' are provided inside box portion 100*a*'. Cash dispensing machine 200*a*' is a front-load type device, which is replenished with cash on the same side that cash is dispensed from cash dispensing output 220'. Cash dispensing output 220' is, in turn, aligned with a slot opening 240' in door member 100*b*'. Thus, a customer receives cash from the slot opening 240'.

Rear-load cash dispensing machine 200*b*' is arranged in like manner with respect to the rear wall of box portion 100*a*' in which another slot opening (not shown) is provided.

While the present invention has been described with respect to what are believed to be the most practical embodiments thereof, it is particularly noted that this is by way of example only, and appropriate modifications and variations thereof are possible within the spirit and scope of the claims appended hereto.

What is claimed is:

1. A multiple configuration automatic bank teller machine comprising:

a body portion having an interior, a first open side, and a second open side;

a door member attached to the body portion and being sized so as to close the first open side;

a panel attached to the body portion and being sized so as to close the second open side; and a first reversible customer interface module unit interchangeably mountable in a first configuration so as to be useable from the first open side and a second configuration so as to be useable from the second open side.

2. The multiple configuration automatic bank teller machine of claim 1, wherein the first open side is the front side of the automatic bank teller machine and the second open side is the rear side of the automatic bank teller machine.

3. The multiple configuration automatic bank teller machine of claim 1, further comprising a second reversible customer interface module unit interchangeably mountable in a first configuration so as to be useable from the first open side and a second configuration so as to be serviceable from the second open side.

4. The multiple configuration automatic bank teller machine of claim 3, wherein the first reversible customer interface module unit is configured so as to be useable from the first open side and the second reversible customer interface module unit is configured so as to be useable from the second open side.

5. The multiple configuration automatic bank teller machine of claim 1 wherein the first reversible customer interface module unit includes one or more from the group consisting of:

a visual display screen;

a data entry keypad;

a touch-screen visual display screen;

a magnetic stripe card reader;

a cash dispenser mechanism; and a deposit envelope intake mechanism.

* * * * *